US007482713B2

(12) United States Patent
McDonough

(10) Patent No.: US 7,482,713 B2
(45) Date of Patent: Jan. 27, 2009

(54) SWITCH CONTROLLER

(76) Inventor: Richard P. McDonough, 23015 Donna Dr., Denham Springs, LA (US) 70726

( * ) Notice: Subject to any disclaimer, the term of this patent is extended or adjusted under 35 U.S.C. 154(b) by 298 days.

(21) Appl. No.: 11/293,523

(22) Filed: Dec. 2, 2005

(65) Prior Publication Data

US 2007/0126288 A1 Jun. 7, 2007

(51) Int. Cl.
*G06F 13/40* (2006.01)

(52) U.S. Cl. ........................................ 307/134; 326/52

(58) Field of Classification Search ................. 307/115, 307/134; 315/362; 326/52

See application file for complete search history.

(56) References Cited

U.S. PATENT DOCUMENTS 3,629,608 A 12/1971 Trindle
3,697,821 A 10/1972 Johnson
4,525,634 A 6/1985 Southard
4,563,592 A 1/1986 Yuhasz et al.
4,594,515 A * 6/1986 Hummel ..................... 327/456
4,742,441 A * 5/1988 Akerson ...................... 363/97
4,751,401 A 6/1988 Beigel et al.
RE33,504 E 12/1990 Yuhasz et al.
5,359,540 A * 10/1994 Ortiz .......................... 700/295
5,592,058 A * 1/1997 Archer et al. .......... 318/400.09
5,821,704 A * 10/1998 Carson et al. ............... 315/317
6,734,581 B1 * 5/2004 Griffis ........................ 307/125

FOREIGN PATENT DOCUMENTS

WO 88/10020 12/1988
WO 97/22956 6/1997

* cited by examiner

*Primary Examiner*—Stephen W Jackson
*Assistant Examiner*—Daniel Cavallari
(74) *Attorney, Agent, or Firm*—Ladas & Parry LLP

(57) ABSTRACT

A switch controller is described that permits a single AC load to be controlled by DC signals from multiple switches. In one example of the invention, a switch controller includes a switch-state evaluator that receives DC signals from two or more switches and a load controller, responsive to the switch-state evaluator, that controls an AC load. The switch controller changes the state of the load if there is a change in any one of the switches. The switch-state evaluator may be an Exclusive OR integrated circuit, which receives as inputs DC signals from user switches, and a Not OR integrated circuit, which receives as inputs the output signal from the Exclusive OR integrated circuit and DC signals from a disable switch and an override switch. The load controller may be an opto-isolator and a triac.

5 Claims, 3 Drawing Sheets

SWITCH CONTROLLER

BACKGROUND OF THE INVENTION

1. Field of the Invention

This invention concerns controllers, more particularly electrical switch controllers that permit a single electrical load (such as a light) to be controlled by multiple switches.

2. Background Information

It is frequently desirable to control an electrical load—such as a light or a fan—with more than one on/off switch. For example, in a large room with three entrances—such as an auditorium, a warehouse, or a stadium—it would be useful to have three light switches—one at each entrance—to control the lighting for the room.

FIG. 1 shows two conventional wiring methods for a circuit system that allows three switches to control a load. In both cases, two entrances would use a "3-way switch" and one entrance would use a "4-way switch." (Such switches are more complicated and expensive than "single pole" switches that are used when a load is controlled by just one switch.) In these conventional wiring methods, each time a user moves any switch from one position to another (e.g., from down to up or up to down), the state of the light changes (e.g., goes from off to on or on to off). In these conventional methods, standard wire would be used to make electrical connections in at least five segments of the circuit:

(1) from an A.C. HOT terminal to a first 3-way switch;

(2) from the first 3-way switch to the 4-way switch;

(3) from the 4-way switch to the second 3-way switch;

(4) from the second 3-way switch to the light; and (5) from the light to an A.C. NEU terminal.

In a large room, each segment can be quite lengthy; the longer the segment, the more wire must be used and the more labor is required for installation, and thus the more expensive it is to install the circuit. In addition, for safety, the wire in each segment must be "rated" to carry the full load in the circuit. In the U.S., where electrical systems generally use 120 VAC (120 Volts alternating current), relatively heavy 12-gauge wire would typically be used throughout the circuit. Using 3- and 4-way switches is also more expensive than using single-pole switches.

More complex known circuits that permit multiple switches to control a single load are described in U.S. Pat. Nos. 3,629,608 ("Remote Control Circuits"); 4,525,634 ("Alternating Current Switching Device"); 3,697,821 ("Light Dimming System Having Multiple Control Units"); and Re. 33,504 ("Wall Box Dimmer Switch with Plural Remote Control Switches"). But these circuits largely make use of relatively expensive materials.

Using semiconductor devices can entail using less-expensive materials. It is known that semiconductor devices, which are powered by DC, can be coupled via optical isolators to triacs that control AC loads. For example, U.S. Pat. No. 4,594,515 describes multiple switches (designated "LAMP ON," "LAMP OFF," "FAN LOW," "FAN OFF," AND "FAN HIGH") that control multiple loads (lamp, fan low-speed, and fan high-speed). But this patent does not disclose using semiconductor devices that permit multiple switches to control a single load. PCT Application No. WO 97/22956 describes a circuit for controlling a single device with multiple switches connected in parallel through a microcomputer. But this is a relatively complex and expensive circuit.

It would be advantageous to provide a relatively simple device for controlling a single load with multiple switches that can use less-expensive materials and that requires less labor to install.

SUMMARY OF THE INVENTION

In one embodiment of the invention, a switch controller includes a switch-state evaluator—including Exclusive OR and Not OR integrated circuits—that receives DC signals from two or more switches, and a load controller—including a opto-isolator and an AC controller—that responds to the switch-state evaluator and controls an AC load. The switch controller changes the state of the load if there is a state change in any one of the switches.

In another embodiment of the invention, the AC controller is a triac.

In another embodiment of the invention, a switch controller includes a switch-state evaluator—including an Exclusive OR integrated circuit and a Not OR integrated circuit—adapted to receive DC signals from two or more switches, and a load controller—including an opto-isolator and a triac—that responds to the switch-state evaluator and controls an AC load. The switch controller changes the state of the load if there is a state change in any one of the switches.

In another embodiment of the invention, a switch controller includes an Exclusive OR integrated circuit adapted to receive as inputs DC signals from at least five user switches; a Not OR integrated circuit adapted to receive as inputs the output signal from the Exclusive OR integrated circuit and DC signals from a disable switch and an override switch; an opto-isolator adapted to receive as an input the output of the Not OR integrated circuit; and a triac adapted to receive as an input the output of the opto-isolator and to provide as an output an AC signal that controls a load. The switch controller operates as follows: if the disable switch is off and the override switch is off, the triac output changes the state of the load if there is a state change in any one of the user switches; if the disable switch is on and the override switch is off, the triac output indicates that the load is off; and if the override switch is on, the triac output indicates that the load is on.

DETAILED DESCRIPTION OF THE PREFERRED EMBODIMENTS

In one preferred embodiment of the present invention, a switch controller controls a load with multiple switches by using single-pole switches to provide DC input signals; a switch-state evaluator to accept the input signals from the switches and provide a signal indicating whether an AC load should be on or off; and a load controller to turn the load on or off.

Preferably, the switch controller is a solid-state device that uses digital logic to control a 120 vac load. In other words, the switch controller is a solid-state device that uses DC inputs to switch power to an output that controls an AC-load. Preferably, when the input detects a change in the state of the switches, an optical signal is sent to the output that changes the state of the solid-state device accordingly.

In another preferred embodiment, the load controller includes an opto-isolator and an AC current controller that controls the load.

More preferably, the AC current controller is a triac. In this embodiment, the switches are optically isolated from the load, meaning that there is no physical connection between the switches and the load. The input section of the switch controller continuously reads the state of the switches. This information is then optically sent to the output, which turns the load on or off, depending on the state of the switches.

Figure 2:
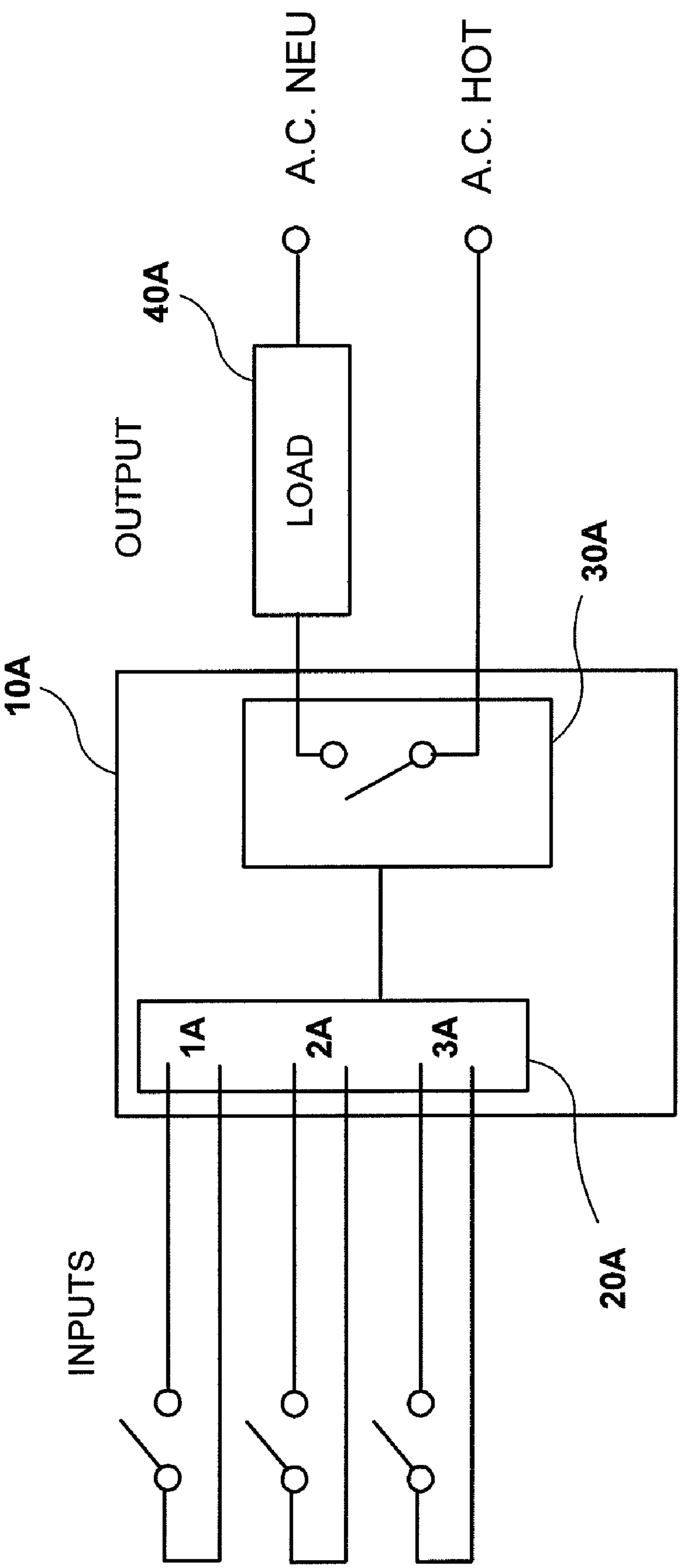
FIG. 2 is a schematic circuit diagram showing a circuit system using one embodiment of a switch controller according to the present invention.

FIG. 2 is a schematic circuit diagram of a circuit system using a switch controller according to the present invention. Switch controller 10A includes switch-state evaluator 20A and load controller 30A, which are connected to each other. In addition, load controller 30A is connected to load 40A (which is connected to A.C. NEU) and to A.C. HOT. Switch-state evaluator 20A accepts at inputs 1A-3A signals from three switches. When the circuit is first powered on, or when the state of any switch changes, switch-state evaluator 20A causes the signal being sent to load controller 30A to indicate that the load is to be either on or off.

Figure 1:
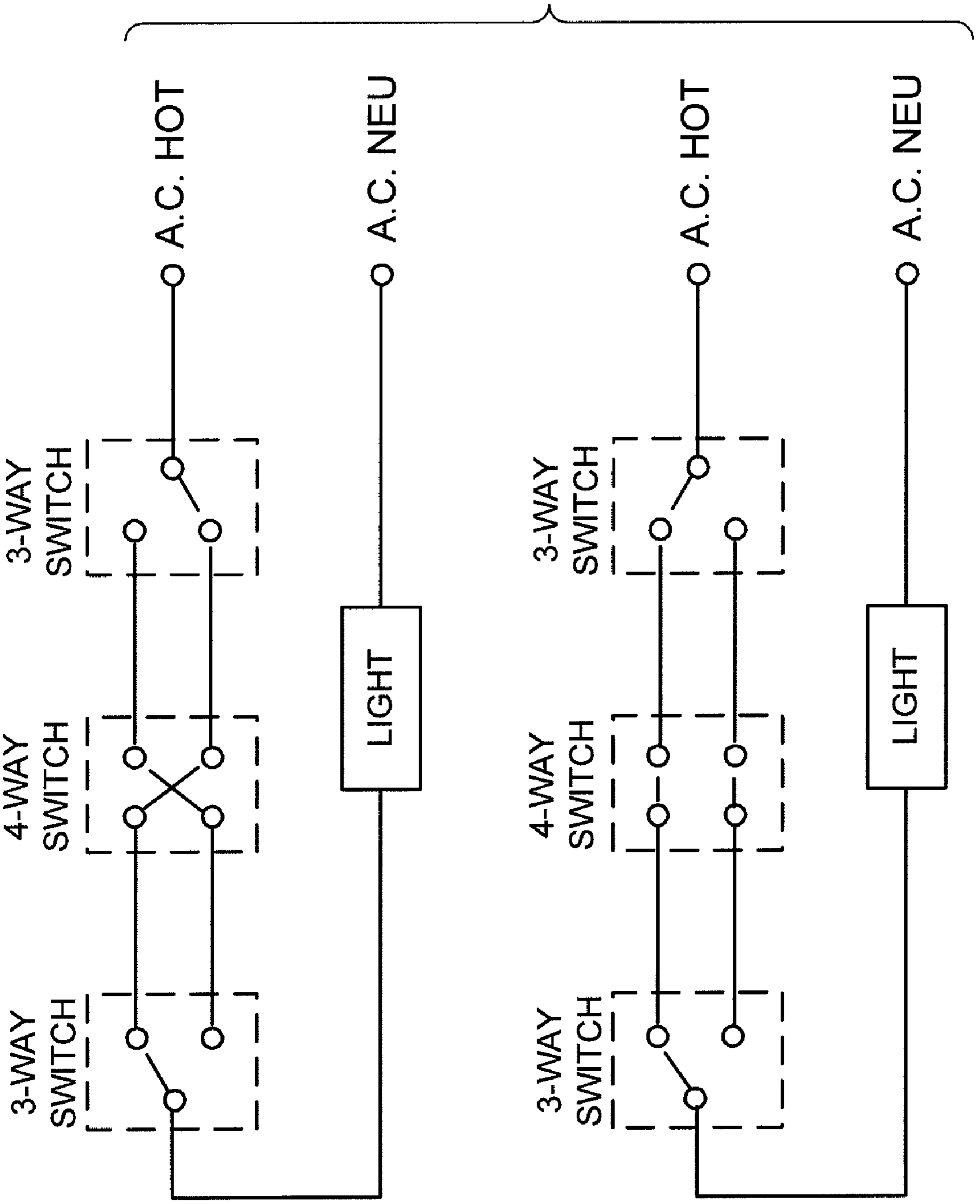
FIG. 1 PRIOR ART
FIG. 1 is a schematic circuit diagram showing circuit systems using known ways of wiring a light controlled by three separate light switches, respectively.

One example of a use for the system of FIG. 2 would be the same use described for that of FIG. 1: a large room with three entrances with three light switches—one at each entrance—to control the lighting for the room. In this example, switch-state evaluator 20A accepts at inputs 1A-3A signals from three light switches (preferably, single-pole switches), and load 40A is a light or lighting system for the room. Preferably, switch-controller 10A would be configured (typically through switch-state evaluator 20A) to operate in the same manner as conventional wiring methods such as those depicted in FIG. 1. That is, each time a user moves any switch in the circuit of FIG. 2 from one position to another (e.g., from down to up or up to down), the state of the load changes (e.g., goes from off to on or on to off).

As those of skill in the art will recognize, a switch controller according to the invention—such as switch controller 20A in FIG. 2—may accommodate any number and type of switches. Examples of switches are single-pole switches, relays, sensors, timers, and computers. Also, while the switches, switch-state evaluator 20A, load controller 30A, and load 40A will typically be electrically connected by wire, other connections will be apparent to skilled artisans. Examples of such connections are fiber optics, radio transmission, and infrared transmission. Examples of signals are electrical, optical, and radio signals. Load 40A can be practically any AC load, including lights, fans, pumps, valves, and motors. Load 40A can also be of practically any complexity; for example, a single light bulb or multiple lighting systems in a stadium.

A switch controller according to the invention may also accept one or more inputs aside from those used to turn the load on or off. For example, switch-state evaluator 20A can be configured to accept at additional inputs a disable signal and an override signal. An "on" disable signal will turn the load off and keep it off until the disable signal is "off" or an override signal is "on." An "on" override signal will turn the load on and keep it on until the override signal is "off."

Figure 3:
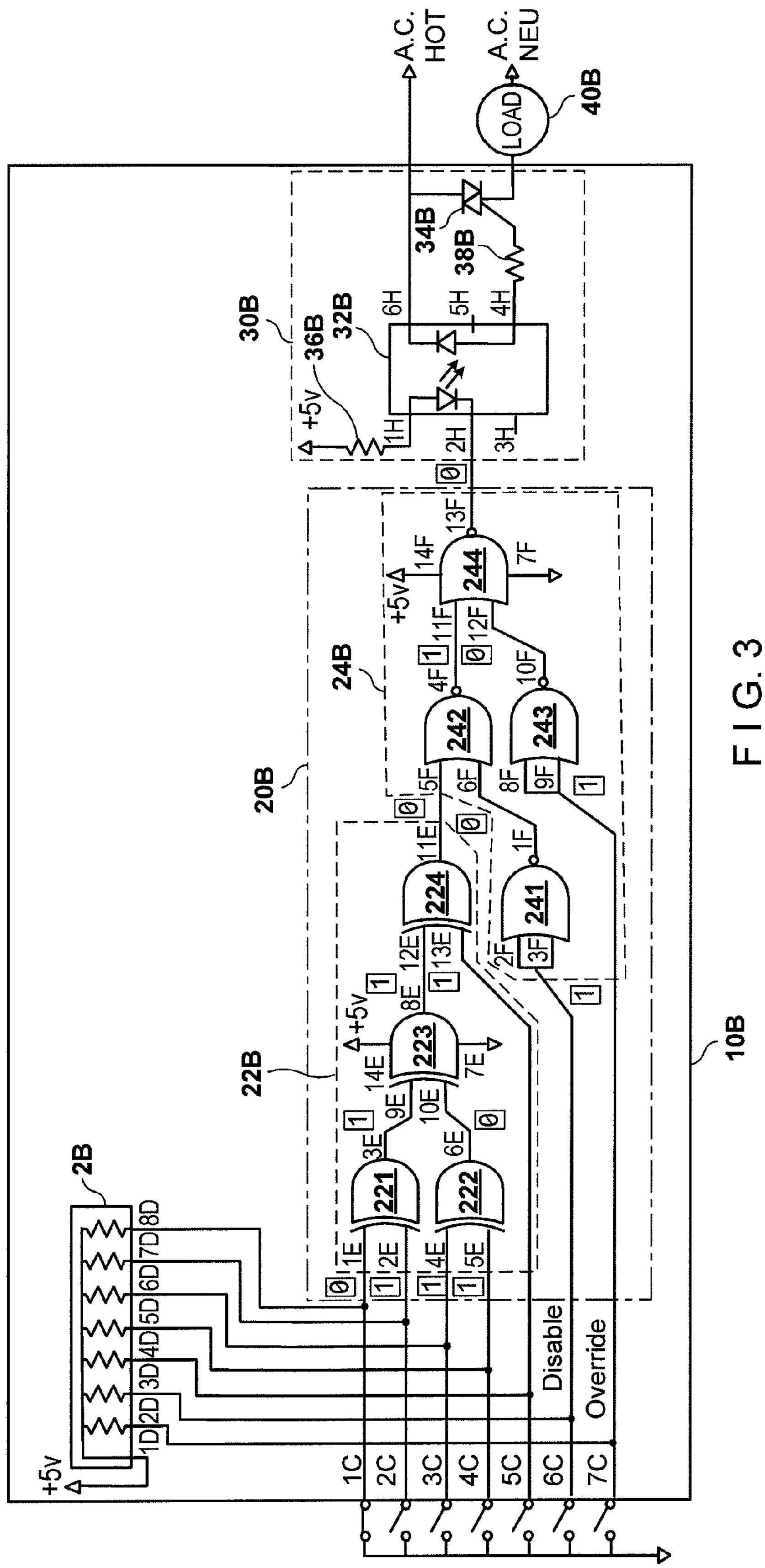
FIG. 3 is a schematic circuit diagram showing a circuit system using another embodiment of a switch controller according to the present invention.

FIG. 3 is a schematic circuit diagram of another circuit system using a switch controller according to the present invention. This circuit includes seven DC inputs: five on/off inputs, one disable input, and one override input. In this example, all inputs are +5 vdc and are activated by any contact closure such as a single-pole switch, a relay, a sensor, a timer, a computer, etc. This provides considerable flexibility to control electrical devices simply and inexpensively.

In this circuit, the seven switches are connected to inputs 1C-7C, which are connected to switch controller 10B, which in turn is connected to load 40B. Inputs 1C-5C provide signals from user switches: switches that may be used to turn load 40B on or off. Any change to any of inputs 1C-5C due to a user switch opening or closing will change the state of the output to the load; if the output was off it will come on and if the output was on it will go off. Input 6C provides a disable signal from a disable switch and input 7C provides an override signal from an override switch. Preferably, an open switch results in a digital 1 and a closed switch results in a digital 0; other conventions could be used. Also in this example, a digital 1 is represented by +5 vdc and a digital 0 is represented by 0 vdc; again, other conventions could be used.

Switch controller 10B includes resistor unit 2B, switch-state evaluator 20B, and load controller 30B. Resistor unit 2B, preferably a resistor pack of eight pins 2D-8D to inputs 1C-7C on +5 v from pin 1D as shown in FIG. 3, ensures a digital 1 to the inputs when the switches are open and limits the current when the switches are closed. Switch-state evaluator 20B includes user-input evaluator 22B, which accepts signals from inputs 1C-5C (user switches), and extra-input evaluator 24B, which accepts signals from inputs 6C and 7C (disable and override switches).

Preferably, user-input evaluator 22B is a 14-pin integrated circuit (IC) that contains four 2-input Exclusive OR (XOR) logic gates 221-224; one suitable XOR IC is available from National Semiconductor under part numbers DM54LS86/DM74LS86. FIG. 3 shows pin numbers 1E-14E for the XOR IC, with inputs 1C-5C connected to pins 1E, 2E, 4E, 5E, and 13E, and the result of user-input evaluator 22B expressed on pin 11E. Also preferably, extra-input evaluator 24B is a 14-pin IC that contains four 2-input Not OR (NOR) logic gates; one suitable NOR IC is available from National Semiconductor under part numbers 54LS02/DM54LS02/DM74LS02. FIG. 3 also shows pin numbers 1F-14F for the NOR IC, with the result of user-input evaluator 22B (on XOR IC pin 11E) connected to pin 5F, input 6C (disable) connected to pins 2F and 3F, input 7C (override) connected to pins 8F and 9F, and the result of extra-input evaluator 24B expressed on pin 13F.

Load controller 30B includes opto-isolator 32B, AC controller 34B, and current-limiting resistors 36B and 38B. Preferably, opto-isolator 32B is a 6-pin opto-isolator IC; one suitable opto-isolator is available from Fairchild Semiconductor under series numbers MOC303XM and MOC304XM. FIG. 3 shows pin numbers 1H-6H for the opto-isolator IC, with the result of extra-input evaluator 24B (on NOR IC pin 13F) connected to pin 2H, pin 6H connected to A.C. Hot, and the output provided on pin 4H. An opto-isolator IC uses a DC voltage to control an AC voltage with an LED (Light Emitting Diode) and an LDD (Light Detecting Diode). The use of optics (light) to control the output means that there is no physical connection between the input (+5 vdc) and the output (120 vac).

Also preferably, AC controller 34B, is a triac. A triac is a semiconductor that controls the flow of alternating current (AC). One suitable triac is available from Philips Semiconductors under series number BT137. The output of opto-isolator 32B (on opto-isolator IC pin 4H) is connected (via current-limiting resistor 38B) to AC controller 34B. AC controller 34B is connected to load 40B, which in turn is connected to A.C. Neu.

Operation of the preferred embodiment of the invention used in the circuit-system example of FIG. 3 may be more easily explained by considering the system to have input and output sections. The input section consists of the switches

1C-7C and switch-state evaluator 20B (in this example, logic gates 221-224 on the XOR IC [user-input evaluator 22B] and logic gates 241-244 on the NOR IC [extra-input evaluator 24B]). The output section consists of load controller 30B (here the opto-isolator IC 32B and the triac [AC controller 34B]).

The output section—whose main function is to turn load 40B on or off—operates as follows. When pin 2H of the opto-isolator IC is brought to digital 0 (low) by the result on NOR IC pin 13F, the LED in the opto-isolator IC is energized. The LDD in the opto-isolator IC detects this and allows current to flow (through a current-limiting resistor) to the gate of the triac. The triac is turned on and power flows to load 40B. If the result on NOR IC pin 13F changes the state of opto-isolator IC pin 2H from digital 0 (low) to digital 1 (high), the LED turns off the LDD, which stops the current flow to the triac and, in turn, power to the load stops.

Preferably, the output is controlled using zero crossover switching: when the output is called to turn on it will energize only when the AC voltage is at zero. This is advantageous when controlling inductive loads such as fans and motors.

The input section—whose main function is to decode the state of the switches and send a digital 1 or 0 to opto-isolator IC pin 2H in the output section—operates as follows. In this example, a closed switch results in a digital 0 (low) signal on the associated input (representing "on"), and an open switch results in a digital 1 (high) signal on the associated input (representing "off"). In FIG. 3, the value of each of the several inputs and outputs for the examples to be discussed is indicated with either a 1 or a 0 in a rectangle; for instance, the values of pins 1E, 2E, 4E, and 5E on the XOR IC (user-input evaluator 22B) are 0, 1, 1, and 1, respectively. For the XOR and NOR logic gates, an output C for two inputs A and B are determined according to standard truth tables; Table 1 is an XOR truth table and Table 2 is a NOR truth table:

TABLE 1

| | XOR | |
|---|---|---|
| A | B | C |
| ø | ø | ø |
| ø | 1 | 1 |
| 1 | ø | 1 |
| 1 | 1 | ø |

TABLE 2

| | NOR | |
|---|---|---|
| A | B | C |
| ø | ø | 1 |
| ø | 1 | ø |
| 1 | ø | ø |
| 1 | 1 | ø |

As to the input section, any change to the user switches (which control inputs 1C-5C) due to a switch opening or closing will change the state of the output: if the state starts as off, the input will come on, and if the state starts as on the input will go off. This will happen as long as the switches that control the disable and override inputs are open (i.e., inputs 6C and 7C are off).

If all the switches are open the output is off. If the switch controlling input 1C is closed, as shown in FIG. 3, the following cascade effect occurs:

XOR IC pin 1E will go low, pins 3E, 8E, 9E, and 12E will go high, and pin 11E will go low;

NOR IC pin 5F will go low, pins 4F and 11F will go high, and pin 13F will go low; and opto-isolator IC pin 2H will go low, which causes the triac to turn on load 40B.

If the switch controlling input 6C (the disable switch) is closed, the output will turn off and stay that way until the disable switch is opened or the override switch is closed. When the disable switch is closed, the output is off, and changing the state of any or all of the user switches will have no effect on the output.

An example of the operation of the disable switch is as follows. Assume that the circuit system starts in the state shown in FIG. 3, with the switch controlling input 1 closed and the other user switches open, meaning that the output is on. When the disable switch is closed the following cascade effect occurs:

NOR IC pins 2F and 3F will go low, pins 1F and 6F will go high, pins 4F and 11F will go low, and pin 13F will go high; and opto-isolator IC pin 2H will go high, which causes the triac to turn off load 40B.

If the switch controlling input 7C (the override switch) is closed, the output will turn on and stay that way until the override switch in opened. When the override switch is closed, the output is on, and changing the state of any or all of the user switches will have no effect on the output.

An example of the operation of the override switch is as follows. Assume again that the circuit system starts in the state shown in FIG. 3, but with all switches open, meaning that the output is off. When the override switch is closed the following cascade effect occurs:

NOR IC pins 8F and 9F will go low, pins 10F and 12F will go high, and pin 13F will go low; and opto-isolator IC pin 2H will go low, which causes the triac to turn on load 40B.

A circuit using a switch controller according to the invention provides considerable advantages over conventional wiring methods. Using digital inputs removes the need to physically switch the AC power. This allows, to cite just one example, replacing the complex 3- and 4-way switches and heavy 12-gauge wire that are typically used (such as in the circuit systems of FIG. 1) with less-expensive single-pole switches and 26-gauge wire. Loads can be controlled from multiple locations at extremely long distances inexpensively by using small-gauge wire and any contact closure.

Installing circuit systems using the inventive switch controller is also likely to be less expensive than using conventional wiring methods, because the switch controller's relatively simple wiring scheme requires less labor to install.

Systems using the switch controller are particularly appropriate for warehouses, auditoriums, stadiums, and other large rooms and buildings. On the other hand, switch controllers according to the invention can use electronics—such as XOR, NOR, and opto-isolator ICs and triacs—that are small enough to fit appliances such as light fixtures and ceiling fans, allowing manufactures to integrate switch controllers into their products.

In addition, the low-level DC voltage on the inputs (such as inputs 1A-3A in FIG. 2 and inputs 1C-7C in FIG. 3) reduces the hazard of electrical shock and fire. Also, more switches and inputs can be added to the circuit simply by connecting them to input evaluator 20B. Moreover, a wide variety of switches can be used with inputs to the switch controller—including remotes, infrared, temperature, and sound—and other devices such as computers and alarm systems can also be connected to the switch controller for automated control. Those of skill in the art will recognize that many other types of switches and automation controls can be used.

Although the present invention has been described with reference to preferred embodiments, numerous modifications and variations can be made without departing from the scope of the invention. The invention is defined by the appended claims; no other limitation—such as details of the specific preferred embodiments disclosed—is intended or should be inferred.

The invention claimed is:

1. A switch controller for controlling a state of a load, comprising:

a. a switch-state evaluator comprising an Exclusive OR integrated circuit and a Not OR integrated circuit for receiving DC signals from a plurality of switches having states controlling the state of the load; wherein the Exclusive OR integrated circuit receives, as inputs, the DC signals of the switches and provides an output which is received, as an input, by the Not OR integrated circuit, and wherein the Not OR integrated circuit provides an output of the switch-state evaluator; and b. a load controller comprising an opto-isolator and an AC controller for response to the output of the switch-state evaluator and changing the state of the load if there is a change in the state of any one of the plurality of switches.

2. A switch controller according to claim 1, wherein the Not OR integrated circuit comprises a plurality of two-input Not OR logic gates.

3. A switch controller, comprising:

a. a switch-state evaluator comprising an Exclusive OR integrated circuit and a Not OR integrated circuit adapted to receive DC signals from a plurality of switches; wherein the Exclusive OR integrated circuit receives, as inputs, the DC signals of the switches and provides an output which is received, as an input, by the Not OR integrated circuit, and wherein the Not OR integrated circuit provides an output of the switch-state evaluator;

b. an opto-isolator, responsive to the output of the switch-state evaluator; and c. a triac, responsive to the opto-isolator, that controls an AC load, wherein the triac changes the state of the load if there is a state change in any one of the plurality of switches.

4. A switch controller, comprising:

a. an Exclusive OR integrated circuit adapted to receive as inputs DC signals from at least five user switches;

b. a Not OR integrated circuit adapted to receive as inputs i. an output signal from the Exclusive OR integrated circuit and ii. DC signals from a disable switch and an override switch;

c. an opto-isolator adapted to receive, as an input, an output of the Not OR integrated circuit; and d. a triac adapted to receive, as an input, an output of the opto-isolator and to provide as an output an AC signal that controls a load, e. wherein, i. if the disable switch is off and the override switch is off, the triac output changes the state of the load if there is a state change in any one of the user switches;

ii. if the disable switch is on and the override switch is off, the triac output indicates that the load is off; and iii. if the override switch is on, the triac output indicates that the load is on.

5. A switch controller, comprising:

a. an Exclusive OR integrated circuit adapted to receive as inputs DC signals from at least three user switches;

b. a Not OR integrated circuit adapted to receive as inputs i. an output signal from the Exclusive OR integrated circuit and ii. DC signals from a disable switch and an override switch;

c. an opto-isolator adapted to receive, as an input, an output of the Not OR integrated circuit; and d. a triac adapted to receive, as an input, an output of the opto-isolator and to provide, as an output, an AC signal that controls a load, e. wherein, i. if the disable switch is off and the override switch is off, the triac output changes the state of the load if there is a state change in any one of the user switches;

ii. if the disable switch is on and the override switch is off, the triac output indicates that the load is off; and iii. if the override switch is on, the triac output indicates that the load is on.

* * * * *